US008602439B2

(12) United States Patent
Lee et al.

(10) Patent No.: US 8,602,439 B2
(45) Date of Patent: Dec. 10, 2013

(54) HITCH RECEIVER APPARATUS FOR VEHICLE

(75) Inventors: Seung Mok Lee, Gunpo-si (KR); Nae Ung Jang, Hwaseong-si (KR); Dong Eun Cha, Seongnam-si (KR); Nam Cheol Kim, Suwon-si (KR); Hoo Taek Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/528,243

(22) Filed: Jun. 20, 2012

(65) Prior Publication Data

US 2013/0147157 A1 Jun. 13, 2013

(30) Foreign Application Priority Data

Dec. 12, 2011 (KR) ........................ 10-2011-0133132

(51) Int. Cl.
*B60D 1/54* (2006.01)
*B60R 19/48* (2006.01)

(52) U.S. Cl.
CPC .. *B60D 1/54* (2013.01); *B60R 19/48* (2013.01)
USPC ........................................................ 280/491.1

(58) Field of Classification Search
CPC ........................................................ B60R 19/20
USPC ................ 280/491.1, 500, 501; 293/106, 117
See application file for complete search history.

(56) References Cited

U.S. PATENT DOCUMENTS 4,109,930 A * 8/1978 Pilhall ........................ 280/491.4
6,168,216 B1 * 1/2001 Nakajima et al. ............. 292/201

FOREIGN PATENT DOCUMENTS

KR 1020080021912 A 3/2008
KR 10-0821782 B1 4/2008

* cited by examiner

*Primary Examiner* — Kevin Hurley
*Assistant Examiner* — Felicia L Brittman
(74) *Attorney, Agent, or Firm* — Morgan, Lewis & Bockius LLP

(57) ABSTRACT

A hitch receiver apparatus for a vehicle may include a hitch guide-hole formed in a storage box provided in an inner space of a rear bumper, the hitch guide-hole extending in a traverse direction of the vehicle; and a hitch receiver rotatably coupled to the storage box and selectively is received into or taken out through the hitch guide-hole.

6 Claims, 9 Drawing Sheets

HITCH RECEIVER APPARATUS FOR VEHICLE

CROSS-REFERENCE TO RELATED APPLICATIONS

The present application claims priority to Korean Patent Application No. 10-2011-0133132 filed on Dec. 12, 2011, the entire contents of which is incorporated herein for all purposes by this reference.

BACKGROUND OF THE INVENTION

1. Field of the Invention

The present invention relates, in general, to a hitch receiver apparatus for a vehicle and, more particularly, to a hitch receiver apparatus for a vehicle that is configured such that it can be installed using a storage box, which is provided in the inner space of a rear bumper.

2. Description of Related Art

In general, a hitch receiver apparatus functions to connect a trailer to a towing vehicle. As shown in FIG. 1 and FIG. 2, the hitch receiver apparatus includes a hitch receiver 1 and a receiver bracket 2, which are integrally coupled to each other. The receiver bracket 2 is coupled to the central portion of a rear back beam 3. In some cases, a plurality of reinforcement members 5 that connect the receiver bracket 2 to side members 4 is added as required.

When the trailer function is required, the hitch receiver is used by fixedly inserting a draw bar 6 the hitch receiver 1, and coupling a ball joint 7 to the draw bar 6. After use, the draw bar 6 and the ball joint 7 are detached from the hitch receiver 1 and are then stored separately.

However, in the hitch receiver apparatus of the related art, even though the trailer function is not used, the hitch receiver 1, which is coupled to the rear back beam 3, constantly protrudes downwards from the rear back beam 3, as shown in FIG. 3 and FIG. 4. Therefore, in addition to a rear bumper 8 that covers the rear back beam 3, a hitch cover 9 that covers the hitch receiver 1 is separately required. This disadvantageously leads to an increase in weight and cost.

Furthermore, the hitch cover 9 decreases the ground clearance of the vehicle, which is then subjected to frequent contacts with the ground. This causes a drawback in that the hitch cover 9 is easily damaged or broken.

In addition, the coupling of the hitch receiver 1 to the rear back beam 3 increases the backward protrusion of the hitch cover 9 that covers the hitch receiver 1. This consequently decreases the degree of freedom of the design of the vehicle, which is disadvantageous.

Furthermore, the use of the reinforcement members 5, which are connected to the side members 4 in order to reinforce the strength of the hitch receiver 1, disadvantageously increases the weight and cost.

In FIG. 4, reference numeral X1 indicates the extent by which the hitch cover protrudes backwards with respect to the rear bumper, and reference numeral Y1 indicates the extent by which the hitch cover protrudes downwards with respect to the rear bumper.

The information disclosed in this Background of the Invention section is only for the enhancement of understanding of the background of the invention, and should not be taken as an acknowledgment or any form of suggestion that this information forms a prior art that would already be known to those skilled in the art.

BRIEF SUMMARY

Various aspects of the present invention are directed to providing a hitch receiver apparatus for a vehicle, in which a hitch receiver is provided using a storage box provided in the inner space of a rear bumper, such that the hitch receiver can be stored inside a rear end panel when it is not used, thereby helping to provide strength to the vehicle, and such that the use of a hitch cover is omitted, thereby reducing weight and cost and furthermore increasing the degree of freedom of the design of the vehicle.

In an aspect of the present invention, a hitch receiver apparatus for a vehicle, may include a hitch guide-hole formed in a storage box provided in an inner space of a rear bumper, the hitch guide-hole extending in a traverse direction of the vehicle, and a hitch receiver rotatably coupled to the storage box and selectively is received into or taken out through the hitch guide-hole.

The hitch receiver apparatus may include a hitch striker provided on the hitch receiver, a hitch latch fixed to the storage box, wherein, when the hitch receiver is rotated with respect to the storage box so that the hitch receiver protrudes backwards from the vehicle, the hitch receiver is engaged to the hitch latch so as to prevent the hitch receiver from rotating, and a latch wire connected to the hitch latch, wherein the latch wire operates the hitch latch so that the hitch latch is unfastened from the hitch striker.

The hitch guide-hole is formed in a back panel and extends in the traverse direction of the vehicle, the back panel facing a rear end panel in a support tray of the storage box.

The back panel may have a plurality of back panel flanges protruding toward a front of the vehicle, the back panel flanges being disposed on both upper and lower sides of the hitch guide-hole so as to face each other, and the hitch receiver is disposed between the back panel flanges and rotatably coupled thereto via a hinge shaft, which extends through the back panel flanges.

The hinge shaft extends through the back panel flanges and the hitch receiver.

The hitch receiver may have a hitch flange integrally protruding from one portion thereof, and the hinge shaft extends through the back panel flanges and the hitch flange.

The storage box may include a lower tray defining therein a space in which articles are stored, and a tray cover rotatably coupled to the lower tray via a link member wherein the support tray is coupled to the lower tray such that the support tray supports the lower tray.

The tray cover is integrally coupled with a bumper door, the bumper door being disposed in a removed portion of the rear bumper.

In the hitch receiver apparatus for a vehicle according to exemplary embodiments of the invention, the hitch receiver can be stored inside the rear end panel when it is not used. When the hitch receiver is used for the trailer function, the storage box is opened and then the hitch receiver is taken out such that it protrudes from the rear side of the vehicle. This can omit the use of a hitch cover, thereby reducing the number of components, weight and cost. Furthermore, this can increase the degree of freedom of the design of the vehicle, thereby improving the aesthetic appearance of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
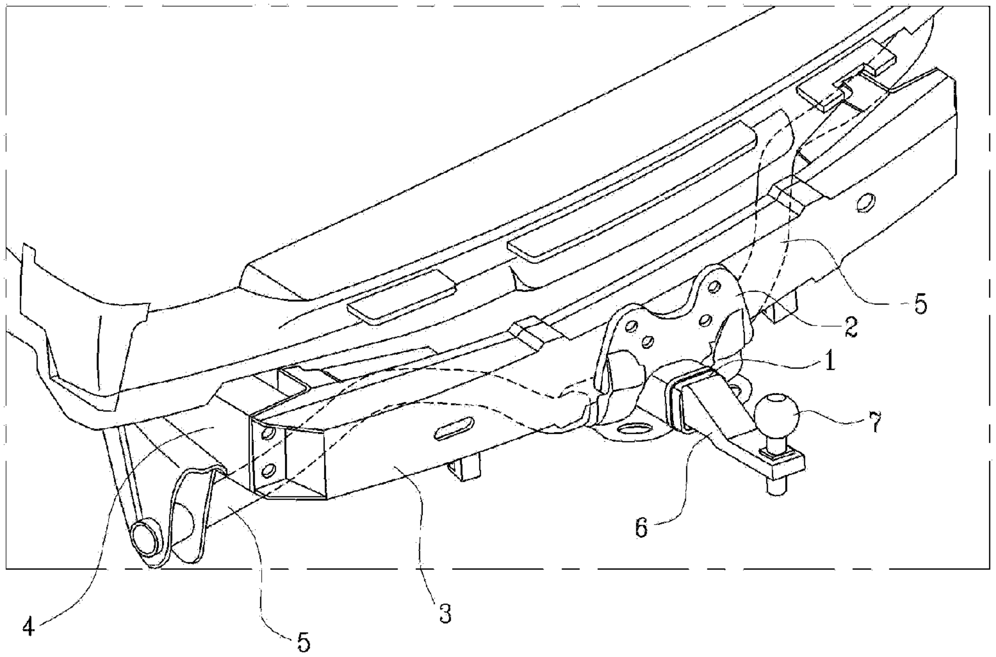
FIG. 1 and FIG. 2 are views depicting a hitch receiver apparatus of the related art.
Figure 2:
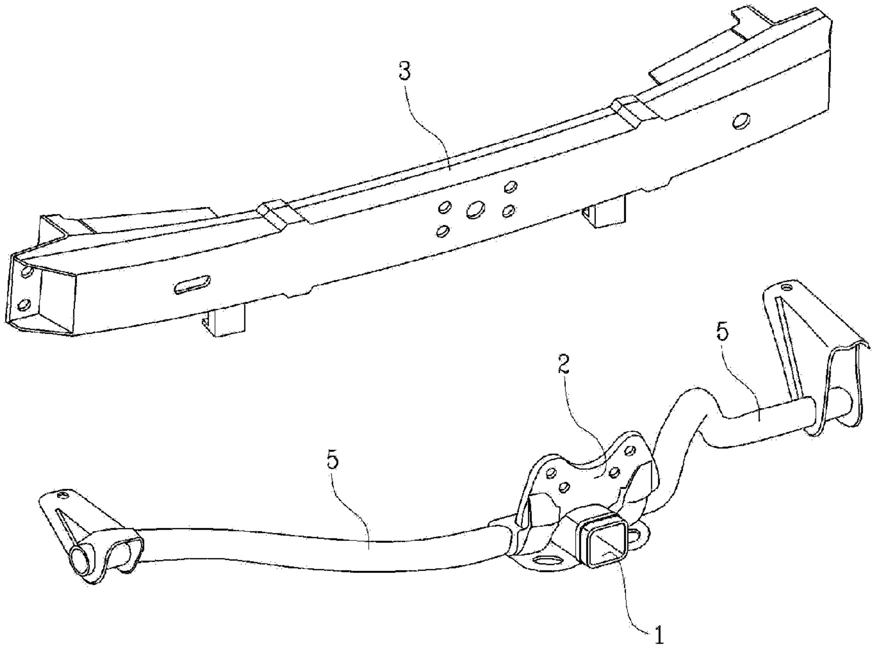
Figure 3:
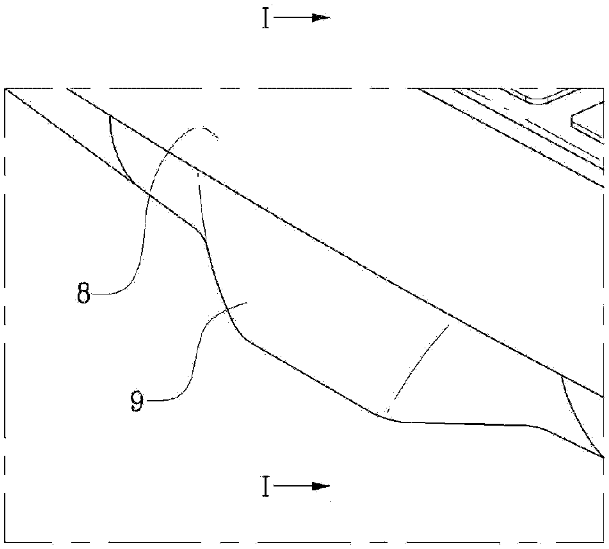
FIG. 3 is a view showing a hitch cover for concealing the hitch receiver apparatus of the related art.
Figure 4:
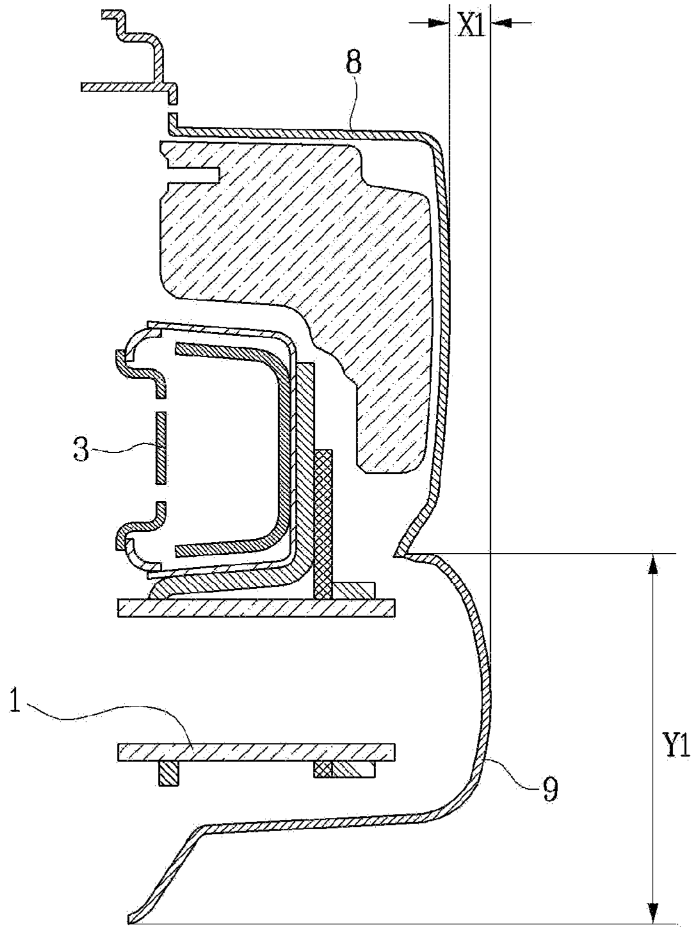
FIG. 4 is a cross-sectional view taken along line I-I in FIG. 3.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter exemplary embodiments of a hitch receiver apparatus according to the invention will be described with reference to the accompanying drawings.

Figure 5:
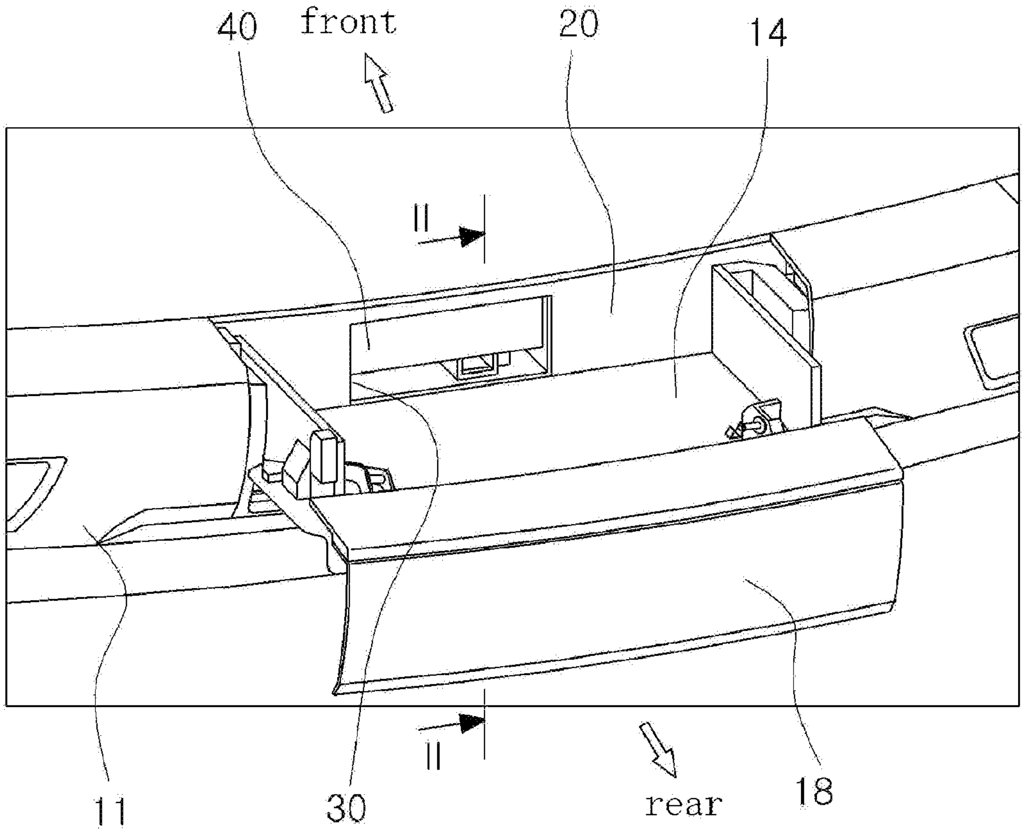
FIG. 5 is a view depicting a hitch receiver apparatus according to an exemplary embodiment of the invention.
Figure 6:
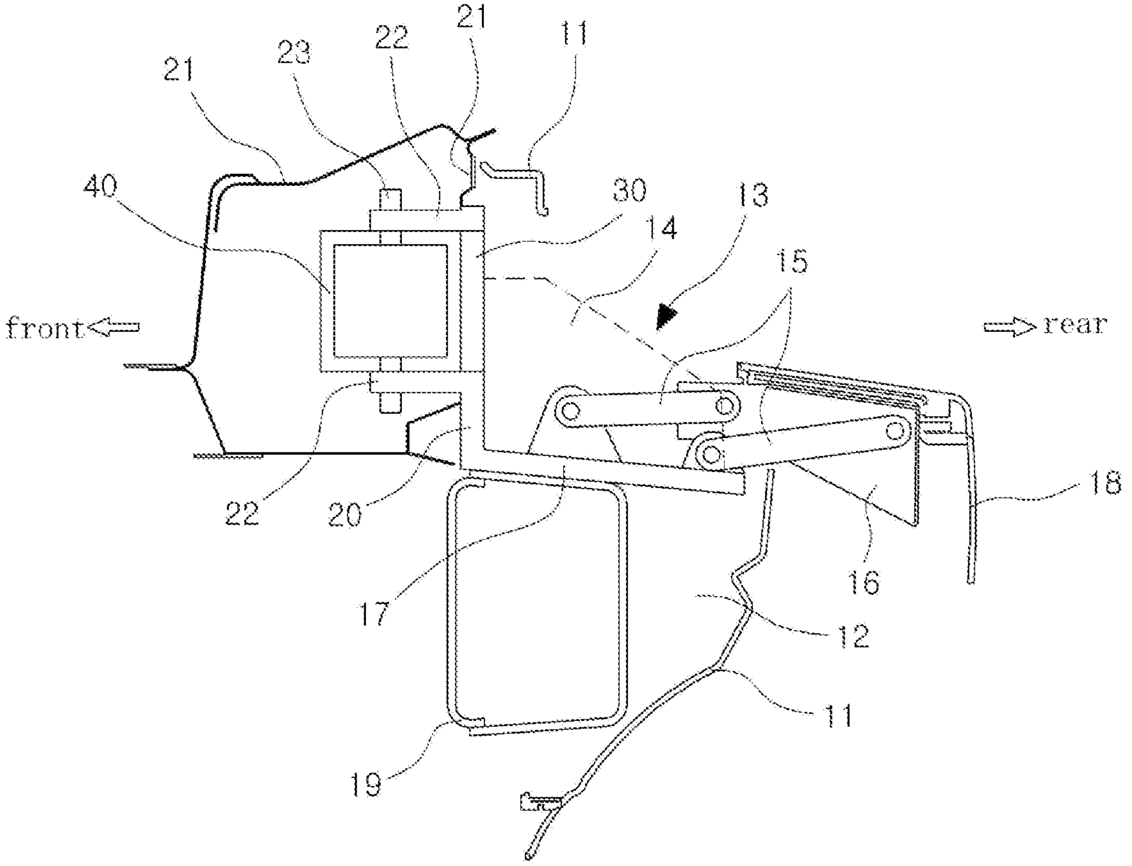
FIG. 6 is a cross-sectional view taken along line II-II in FIG. 5.

As shown in FIG. 5 and FIG. 6, a hitch receiver apparatus according to an exemplary embodiment of the invention is configured such that a storage box 13 is provided inside the inner space 12 of a rear bumper 11, which corresponds to a reserved space of a vehicle. The storage box 13 includes a lower tray 14, which defines a space in which articles are stored, a tray cover 16, which is rotatably coupled to the lower tray 14 via a link member 15, and a support tray 17, which is coupled to the underside of the lower tray 14 such that it supports the lower tray 14.

Here, the tray cover 16 is configured such that it is integrally coupled to a bumper door 18. The bumper door 18 is provided in the portion of the rear bumper 11 that is removed by, for example, cutting. When the tray cover 16 closes the lower tray 14, the bumper door 18 performs the same function as the rear bumper 11. The support tray 17 is configured such that it is seated on the rear back beam 19 and is fixed thereto.

The support tray 17 is configured such that it is seated on the rear back beam 19 and is fixed thereto.

The support tray 17 is integrally provided with a back panel 20 that protrudes upwards and is then bent. The back panel 20 together with the lower tray 14 is configured such that they define a space in which articles can be stored.

A rear end panel 21, which corresponds to a vehicle body panel, is positioned in the front portion of the back panel 20.

Figure 7:
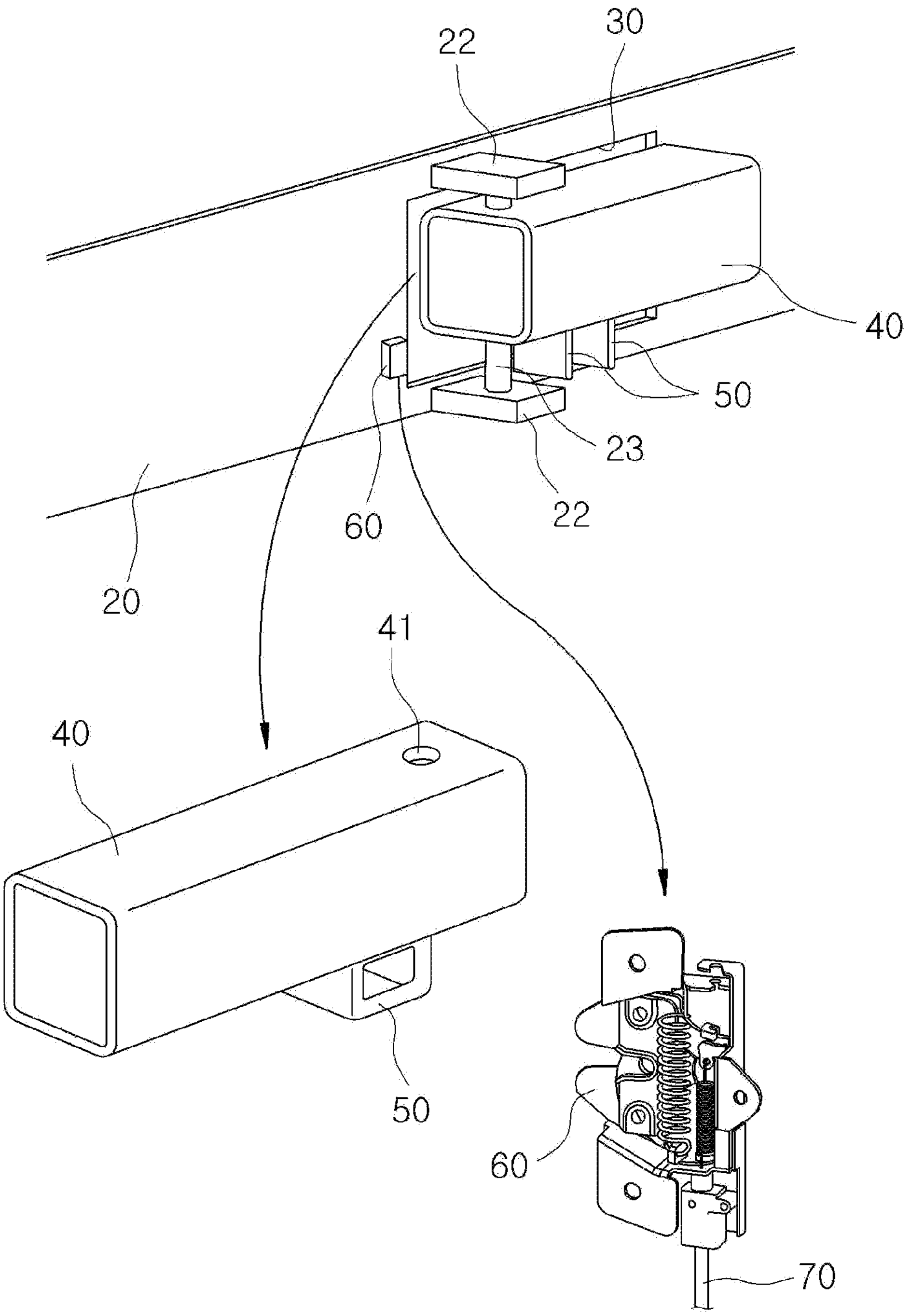
FIG. 7 is a view showing the structure in which the hitch receiver according to an exemplary embodiment of the invention is installed.

As shown in FIG. 5 to FIG. 7, in the hitch receiver apparatus for a vehicle of this embodiment, a hitch guide-hole 30 is formed in the back panel 20 of the support tray 17, which forms the storage box 13, such that it extends in the traverse direction of the vehicle. In addition, a hitch receiver 40 is rotatably coupled to the storage box 13 such that it can be received in and taken out of the storage box 13 through the hitch guide-hole 30.

Figure 9:
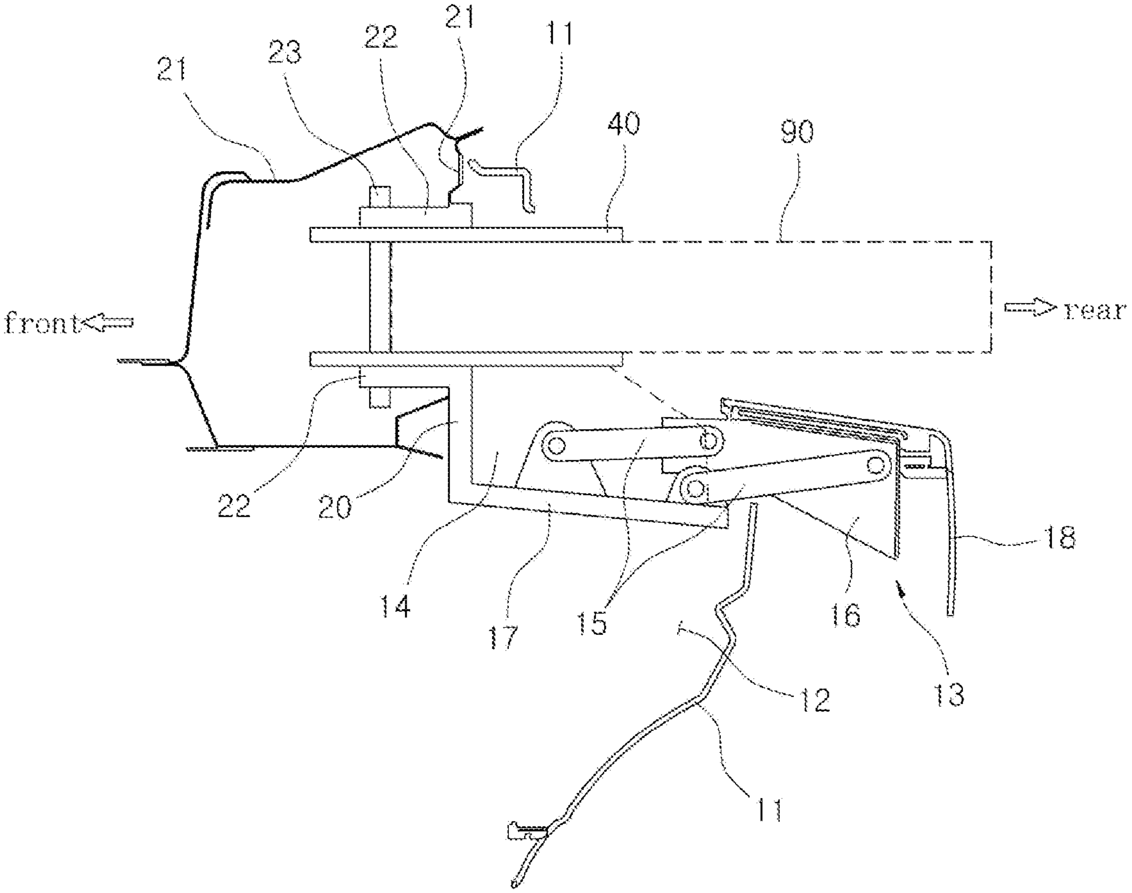
FIG. 9 is a cross-sectional view taken along line in FIG. 8.

As shown in FIG. 6, when the hitch receiver 40 is in the received state, the hitch receiver 40 is positioned inside the rear end panel 21. When the hitch receiver 40 is taken out via rotation, one end of the hitch receiver 40 protrudes from the rear side of the vehicle through the storage box 13, as shown in FIG. 9.

While the hitch receiver 40 has been described as being rotatably coupled to the storage box 13, it can be more specifically described as being rotatably coupled to the back panel 20 of the support tray 17, which constitutes the storage box 13.

The hitch receiver 40 is configured such that it moves through the hitch guide-hole 30 formed in the pack panel 20 when it rotates.

In addition, the hitch receiver apparatus of the present exemplary embodiment also includes a hitch striker 50 provided in the hitch receiver 40 and a hitch latch 60 provided in the storage box 13. When the hitch receiver 30 is rotated with respect to the storage box 13 such that it protrudes from the rear side of the vehicle, the hitch latch 60 can restrain the hitch receiver 40 from rotating, via fastening into the hitch striker 50. The hitch receiver apparatus also includes a latch wire 70 connected to the hitch latch 60. The latch wire 70 operates the hitch latch 60 so that the hitch striker 50 can be unfastened from the hitch latch 60.

Describing in more detail, the hitch latch 60 is positioned on the back panel 20, adjacent to the hitch guide-hole 30.

A plurality of back panel flanges 22 is formed on the back panel 20. The back panel flanges 22 protrude toward the front of the vehicle, and are positioned on both sides of the hitch guide-hole 30 such that they oppose each other. The hitch receiver 40 is rotatable via a hinge shaft 23 that extends through the back panel flanges 22.

As shown in FIG. 7, the hinge shaft 23 is disposed such that it extends through the back panel flanges 22 and the hitch receiver 40. The hitch receiver 40 has shaft holes 41, through which the hinge shaft 23 can extend.

Figure 11:
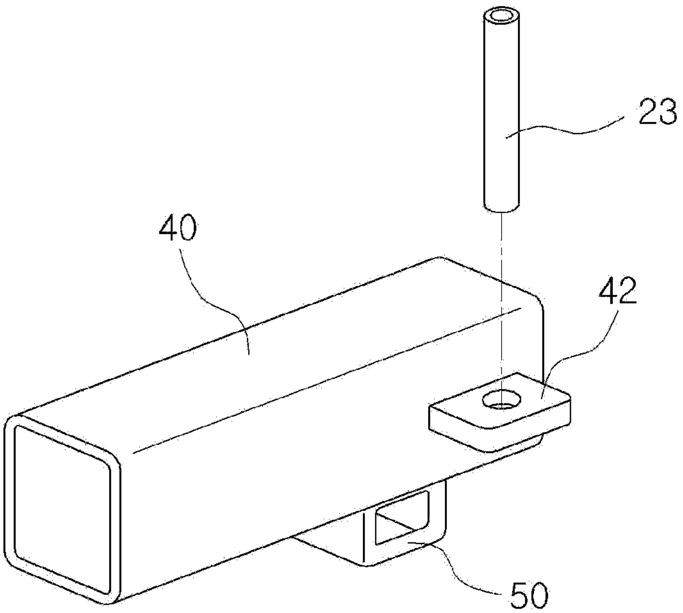
FIG. 11 is a view showing another example of the hitch receiver according to an exemplary embodiment of the invention.

As the hinge shaft 23 is disposed such that it extends through the hinge receiver 40, it is concerned that the draw bar 90 might interfere with the hinge shaft 23 when it is fitted into the hitch receiver 40. In order to prevent it, as shown in FIG. 11, the hitch receiver 40 may be integrally provided with a hitch flange 42, which protrudes therefrom. In this case, the hinge shaft 23 is configured such that it extends through the back panel flanges 22 and the hitch flange 42.

A description will be given below of the operation of the hitch receiver apparatus for a vehicle according to an exemplary embodiment of the invention.

FIG. 5 to FIG. 7 show the state in which the tray cover 16 is opened from the lower tray 14, i.e. the storage box 13 is opened, and the hitch receiver 40 is not used for the trailer function.

In this state, the hitch receiver 40 is positioned inside the rear end panel 21 as being received in the hitch guide-hole 30 of the back panel 20. Consequently, the hitch receiver 40 has the structure that can provide vertical strength to the vehicle body together with the rear end panel 21.

In the state in which the hitch receiver 40 is received as above, the hitch receiver 40 does not protrude to the outside of the vehicle, i.e. downwards from the rear back beam 19. Thus, the hitch cover is not required unlike the related art. Therefore, the present invention can advantageously reduce the number of components, weight and cost.

Furthermore, since the omission of the hitch cover increases the ground clearance of the vehicle, the stability of the vehicle can also be advantageously improved.

Figure 8:
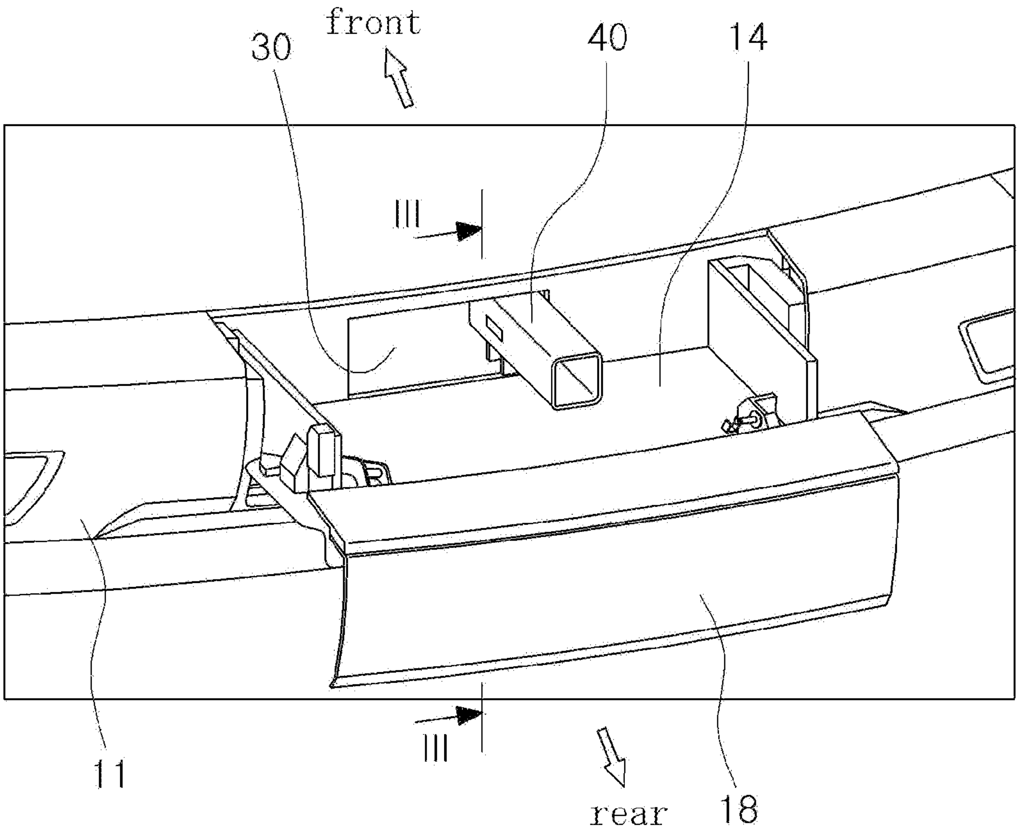
FIG. 8 shows the hitch receiver according to an exemplary embodiment of the invention installed, which is used for a trailer function.
Figure 10:
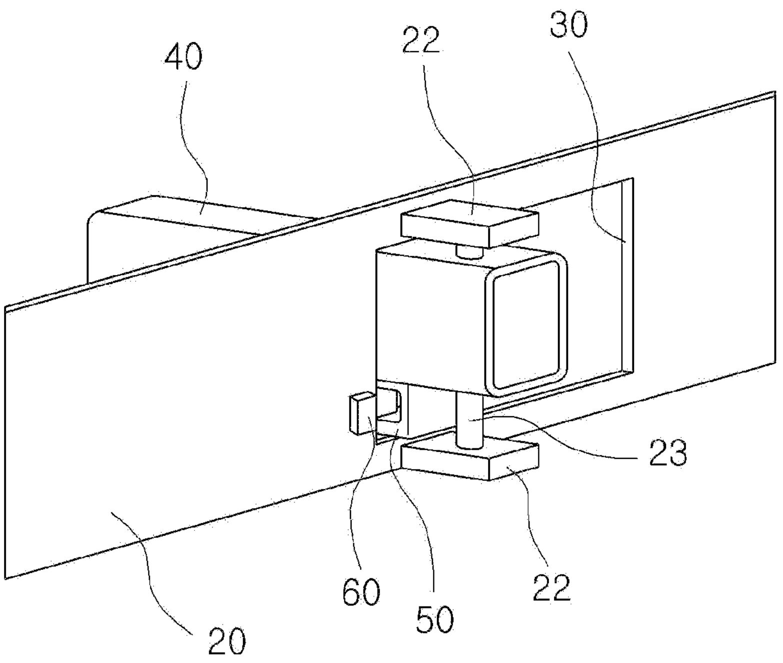
FIG. 10 is a view of the hitch receiver, which is in the posture of FIG. 8.

When intending to use the hitch receiver 40 for the trailer function, an operator is required to only rotate the hitch receiver 40 backwards of the vehicle. Then, the hitch receiver 40 rotates about the hinge shaft 23, so that one end thereof protrudes from the rear side of the vehicle through the hitch guide-hole 30 of the back panel 20, as shown in FIG. 8 to FIG. 10.

When the hitch receiver 40 protrudes from the rear side of the vehicle as above, the hitch striker 50 and the hitch latch 60 are fastened to each other, thereby setting the hitch receiver 40 in the restrained state in which it cannot rotate.

When the hitch receiver 40 is restrained so that it cannot rotate, the operator couples the draw bar 80 and a ball joint into the hitch receiver 40, as shown in FIG. 9, and thus uses the hitch receiver apparatus for the trailer function.

In addition, when intending to keep the hitch receiver 40 by placing it into the rear end panel 21, the operator unfastens the hitch striker 50 from the hitch latch 60 by manipulating the latch wire 70, and then fits the hitch receiver 40 into the hitch guide-hole 30 by rotating it.

As described above, in the hitch receiver apparatus of the present invention, the hitch receiver 40 is not directly coupled to the rear back beam 19 and thus can be kept by being placed into the rear end panel 21 when it is not used. This structure can accordingly omit the use of the hitch cover, thereby reducing the number of components, weight and cost.

Furthermore, since the hitch cover is not used, the ground clearance of the vehicle can be increased, thereby improving the stability of the vehicle.

In addition, in the custody state in which the hitch receiver 40 is not used, the hitch receiver 40 is positioned inside the rear end panel 21. Accordingly, the hitch receiver 40 can advantageously provide vertical strength to the vehicle body together with the rear end panel 21.

Furthermore, since the hitch receiver 40 is not directly coupled to the rear back beam 19, the hitch receiver 40 does not protrude from the rear side of the vehicle. This can further improve the aesthetic appearance of the vehicle, and furthermore increase the degree of freedom of the design of the vehicle.

Moreover; the present invention can reduce the number of components, weight and cost, since it does not use reinforcement members unlike the related art.

For convenience in explanation and accurate definition in the appended claims, the terms “upper”, “lower”, “inner” and “outer” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hitch receiver apparatus for a vehicle, comprising:

a hitch guide-hole formed in a storage box provided in an inner space of a rear bumper, the hitch guide-hole extending in a traverse direction of the vehicle; and a hitch receiver rotatably coupled to the storage box and selectively is received into or taken out through the hitch guide-hole;

wherein the hitch guide-hole is formed in a back panel and extends in the traverse direction of the vehicle, the back panel facing a rear end panel in a support tray of the storage box; and wherein the storage box comprises:

a lower tray defining therein a space in which articles are stored; and a tray cover rotatably coupled to the lower tray via a link member, wherein the support tray is coupled to the lower tray such that the support tray supports the lower tray.

2. The hitch receiver apparatus of claim 1, further comprising:

a hitch striker provided on the hitch receiver;

a hitch latch fixed to the storage box, wherein, when the hitch receiver is rotated with respect to the storage box so that the hitch receiver protrudes backwards from the vehicle, the hitch receiver is engaged to the hitch latch so as to prevent the hitch receiver from rotating; and a latch wire connected to the hitch latch, wherein the latch wire operates the hitch latch so that the hitch latch is unfastened from the hitch striker.

3. The hitch receiver apparatus of claim 1, wherein the back panel has a plurality of back panel flanges protruding toward a front of the vehicle, the back panel flanges being disposed on both upper and lower sides of the hitch guide-hole so as to face each other, and the hitch receiver is disposed between the back panel flanges and rotatably coupled thereto via a hinge shaft, which extends through the back panel flanges.

4. The hitch receiver apparatus of claim 3, wherein the hinge shaft extends through the back panel flanges and the hitch receiver.

5. The hitch receiver apparatus of claim 3, wherein the hitch receiver has a hitch flange integrally protruding from one portion thereof, and the hinge shaft extends through the back panel flanges and the hitch flange.

6. The hitch receiver apparatus of claim 1, wherein the tray cover is integrally coupled with a bumper door, the bumper door being disposed in a removed portion of the rear bumper.

* * * * *